United States Patent
Yoo et al.

(10) Patent No.: US 10,360,467 B2
(45) Date of Patent: Jul. 23, 2019

(54) DEVICE AND METHOD TO GENERATE IMAGE USING IMAGE LEARNING MODEL

(71) Applicant: Samsung Electronics Co., Ltd., Suwon-si, Gyeonggi-do (KR)

(72) Inventors: Byungin Yoo, Seoul (KR); Jun Ho Yim, Daejeon (KR); Jun Mo Kim, Daejeon (KR); Hee Chul Jung, Daejeon (KR); Chang Kyu Choi, Seongnam-si (KR); Jaejoon Han, Seoul (KR)

(73) Assignees: SAMSUNG ELECTRONICS CO., LTD., Gyeonggi-do (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 569 days.

(21) Appl. No.: 14/931,170

(22) Filed: Nov. 3, 2015

(65) Prior Publication Data
US 2016/0125572 A1    May 5, 2016

(30) Foreign Application Priority Data
Nov. 5, 2014    (KR) .................. 10-2014-0152902

(51) Int. Cl.
*G06K 9/00*    (2006.01)
*G06K 9/20*    (2006.01)
(Continued)

(52) U.S. Cl.
CPC ......... *G06K 9/2081* (2013.01); *G06K 9/6255* (2013.01); *G06N 3/0454* (2013.01);
(Continued)

(58) Field of Classification Search
None
See application file for complete search history.

(56) References Cited

U.S. PATENT DOCUMENTS

2008/0201282 A1    8/2008   Garcia et al.
2008/0310720 A1    12/2008  Park et al.
(Continued)

FOREIGN PATENT DOCUMENTS

KR    20050059407 A    6/2005
KR    20110129042 A    12/2011
KR    20130037734 A    4/2013

OTHER PUBLICATIONS

Kan, Meina, Shiguang Shan, Hong Chang, and Xilin Chen. "Stacked progressive auto-encoders (spae) for face recognition across poses." In Proceedings of the IEEE Conference on Computer Vision and Pattern Recognition, pp. 1883-1890. Jun. 28, 2014.*
(Continued)

*Primary Examiner* — Sumati Lefkowitz
*Assistant Examiner* — David Perlman
(74) *Attorney, Agent, or Firm* — Harness, Dickey & Pierce, P.L.C.

(57) ABSTRACT

At least some example embodiments disclose a device and a method for generating a synthetic image and a different-angled image and eliminating noise. The method may include receiving input images, extracting feature values corresponding to the input images using an image learning model, the image learning model permitting an input and an output to be identical and generating a synthetic image based on the feature values corresponding to the input images using the image learning model.

19 Claims, 22 Drawing Sheets

(51) Int. Cl.
   *G06K 9/62* (2006.01)
   *G06N 3/04* (2006.01)
   *G06N 3/08* (2006.01)
   *G06T 5/00* (2006.01)
   *G06T 15/20* (2011.01)

(52) U.S. Cl.
   CPC .............. *G06N 3/084* (2013.01); *G06T 5/002* (2013.01); *G06T 5/006* (2013.01); *G06T 15/205* (2013.01); *G06K 9/00228* (2013.01); *G06K 2209/29* (2013.01); *G06N 3/0445* (2013.01); *G06T 2207/20081* (2013.01); *G06T 2207/20084* (2013.01)

(56) References Cited

U.S. PATENT DOCUMENTS

2010/0134487 A1    6/2010   Lai et al.
2012/0182294 A1    7/2012   Cordon Garcia et al.

OTHER PUBLICATIONS

Zhenyao Zhu et al., "Deep Learning Identity-Preserving Face Space", Chinese University of Hong Kong, Chinese Academy of Sciences, 2013, ICCV2013, pp. 113-120.

Umar Mohammed et al., "Visio-lization: Generating Novel Facial Images", University College London.

\* cited by examiner

DEVICE AND METHOD TO GENERATE IMAGE USING IMAGE LEARNING MODEL

CROSS-REFERENCE TO RELATED APPLICATION

This application claims the priority benefit of Korean Patent Application No. 10-2014-0152902, filed on Nov. 5, 2014, in the Korean Intellectual Property Office, the entire contents of which are incorporated herein by reference in its entirety.

BACKGROUND

1. Field

At least some embodiments relate to a device and a method for generating an image using an image learning model.

2. Description of the Related Art

In an image-related technical field, for example, recognition technology using a learning image, an insufficient number of learning images may greatly affect a recognition rate. Thus, in the recognition technology using a learning image, increasing the number of learning images may improve the recognition rate.

SUMMARY

Although technology for generating a frontal face from a learning image exists, generating a face at a desired angle may not be easy. For example, generating a new frontal image may be enabled by combining a plurality of frontal images. However, generating an image at a new angle may not be easy.

Further, conventional technology may enable generation of a new face using patches extracted from a face image present in a training set and thus, generating a new face through the combining may be limited.

At least some example embodiments relate to a method of generating a synthetic image.

In at least some example embodiments, the method may include receiving input images, extracting feature values corresponding to the input images using an image learning model, the image learning model permitting an input and an output to be identical, and generating a synthetic image based on the feature values corresponding to the input images using the image learning model.

The image learning model may include a neural network, the neural network including at least one layer connected to another layer through a connection line, the connection line having a connection weight.

The generating the synthetic image may include combining the feature values, and generating the synthetic image from the combined feature values using the neural network.

The combining the feature values may include combining the feature values based on a set ratio.

The feature values correspond to an uppermost layer of the neural network from each input image.

The connection weight reduces an error between a reference input image and an output image corresponding to the reference input image.

The input images may include face images of different individuals.

At least other example embodiments relate to a method of generating a different-angled image.

In at least some example embodiments, the method may include receiving an input image and angle information, the input image including an object, and generating an output image based on the input image and the angle information using an image learning model, the learned model being trained in pairs of references images corresponding to different angles, the output image including the objet.

The generating the output image may include generating the output image by converting the input image to correspond to the angle information using the image learning model.

The pairs of reference images may include a first reference angle image corresponding to a first angle and a second reference angle image corresponding to a second angle. The first reference angle image and the second reference angle image include an identical reference object.

The image learning model may include a neural network, the neural network including at least one layer connected to another layer through a connection line, the connection line having a connection weight.

The connection weight value of the neural network may allow the second reference angle image to be output based on the second angle and the first reference angle image.

The angle information may include information associated with an angle for the object.

The object may include a human face.

At least some example embodiments relate to a method of eliminating noise from an image.

In at least some example embodiments, the method may include receiving an input image, and generating an output image by removing noise from at least one patch in the input image using at least one image learning model.

The image learning model may include a neural network, the neural network including at least one layer connected to another layer through a connection line, the connection line having a connection weight.

The connection weight may allow a patch of a reference output image to be generated from a patch of a reference input image.

The image learning model permits the reference output image from which the noise is eliminated to be generated from the reference input image including noise. The generating of the output image includes eliminating the noise from the input image using the image learning model.

The image learning model may include a first learning model to allow a first size patch of the reference output image from which noise is eliminated to be generated from the first sized patch of the reference input image, and a second learning model to allow a second size patch of the reference output image from which noise is eliminated to be generated from the second size patch of the reference input image.

The generating the output image may include eliminating noise in a unit of the first size patch using the first learning model, and eliminating noise in a unit of the second size patch, using the second learning model, from an input image from which the noise is eliminated in the unit of the first size patch.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
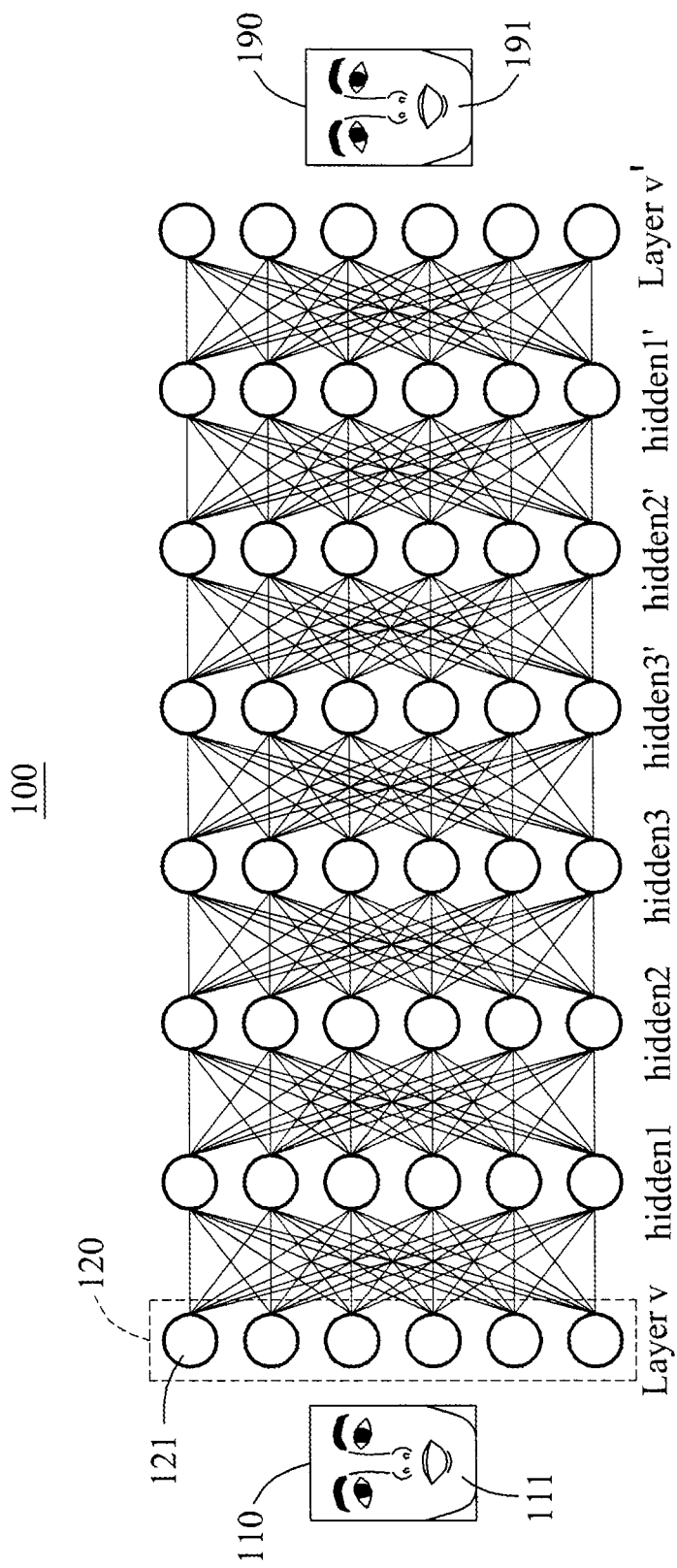
FIG. 1 illustrates an example of a neural network according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates an example of a neural network according to at least one example embodiment.

FIG. 1 illustrates a configuration of a neural network learning device 100. The neural network learning device 100 may learn a neural network, for example, an artificial neural network. The neural network may be a recognition model configured in a form of hardware executing software or hardware that may emulate a computing capability of a biological system using numerous artificial neurons connected through a connection line.

Such a recognition model of the neural network may recognize sequential data and be used for voice recognition, image recognition, physical state recognition, or penmanship recognition. The sequential data may refer to data having temporality or an order, for example, voice data, image data, biological data, and handwriting data. For example, the recognition model of the neural network may recognize a sentence or a word from input voice data or recognize an individual appearing in a video. In addition, the recognition model of the neural network may recognize a physical state of a user by analyzing a biological signal such as an electrocardiogram (ECG) and an electroencephalogram (EEG), or recognize an input handwriting by analyzing an action of a user. Also, the recognition model of the neural network may be used to estimate a correct deoxyribonucleic acid (DNA) sequence from an observation signal of a DNA sequencing device.

The neural network may use the artificial neurons having a simplified function of biological neurons. The artificial neurons may be connected through the connection line having a connection weight. The connection weight may be an intrinsic value of the connection line and indicate connection strength. The neural network may perform a human cognitive function or a learning process through the artificial neurons. An artificial neuron may also be referred to as a node 121.

The neural network may include a plurality of layers 120. For example, the neural network may include an input layer (Layer v) and hidden layers, for example, hidden 1, hidden 2, and hidden 3, and an output layer (Layer v). The input layer may receive an input for performing learning and transmit the input to a hidden layer. The output layer may generate an output of the neural network based on a signal received from nodes of the hidden layers. The hidden layers may be disposed between the input layer and the output layer, and convert learning data transmitted through the input layer to a predictable value. Nodes included in the input layer and the hidden layers may be connected to another through connection lines having connection weights. Similarly, nodes included in the hidden layers and the output layer may be connected to another through connection lines having connection weights. The input layer, the hidden layers, and the output layer may include a plurality of nodes.

The neural network may include a plurality of hidden layers. The neural network including the hidden layers may also be referred to as a deep neural network (DNN), and learning of the DNN may be referred to as deep learning. A node included in a hidden layer may be referred to as a hidden node. An output of a hidden node in a previous time section may be connected to hidden nodes in a current time section, and an output of a hidden node in the current time section may be connected to hidden nodes in a subsequent time section. A neural network having recurrent connections among hidden nodes in different time sections may be referred to as a recurrent neural network.

The neural network learning device 100 may learn the neural network through supervised learning. The supervised learning may be a method of inputting learning data and corresponding output data to the neural network and updating connection weights of connection lines to allow the output data corresponding to the learning data to be output. For example, the neural network learning device 100 may update the connection weights among the artificial neurons through a delta rule and backpropagation learning.

The backpropagation learning may be a method of estimating an error through forward computation of given learning data, propagating the estimated error in a backward direction from the output layer to the input layer through the hidden layers, and updating the connection weights to reduce the error. Processing of the neural network may be performed in a direction from the input layer to the output layer through the hidden layers. However, in the backpropagation learning, the updating of the connection weights may be performed in a direction from the output layer to the input layer through the hidden layers.

The neural network learning device 100 may define an objective function to measure a degree of closeness of currently set connection weights to an optimal and/or desired value, continuously change the connection weights based on a result of the objective function, and repetitively perform learning. For example, the objective function may be an error function used to calculate an error between an output value actually output from the neural network based on learning data and an expected value desired to be output. The neural network learning device 100 may update the connection weights to reduce a value of the error function.

The learning data used for the learning of the neural network may include sequential data, for example, voice data, image data, biological data, and penmanship data. For example, the biological data may include an EEG, an ECG, an electromyogram (EMG), an electrooculogram (EOG), and a pulse.

The neural network learning device 100 may detect a feature value from the learning data. The neural network learning device 100 may obtain a sufficient number of feature values from the learning data, and learn the neural network using the obtained feature values.

For example, when the learning data is image data, various images desired to be learned may be stored. Feature values may be extracted from the image data and the neural network may be learned based on the extracted feature values.

When learning about a single set of the sequential data is terminated, the neural network learning device 100 may initiate learning about another set of the sequential data by changing a learning pattern. In addition, the neural network learning device 100 may adjust a connection weight to be applied to the neural network based on a result of the learning about the sequential data. The neural network learning device 100 may calculate an error by comparing an output value generated in the output layer of the neural network to an expected value desired for the learning data, and adjust the connection weight to be applied to the recognition model of the neural network to reduce the error. The neural network learning device 100 may control the neural network to repetitively perform the learning about all sets of the sequential data included in the learning data based on a predetermined number of repetitions.

The learned neural network may be used to recognize the sequential data. For example, the recognition model of the neural network may extract a feature value from the sequential data when the sequential data is input, and output a result of classification or recognition of the input sequential data by inputting the extracted feature value to a classifier.

Although each of an input image 110 and an output image 190 of the neural network includes a face 111 and a face 191 of an individual, the input image 110 and the output image 190 is not limited thereto and include another object. The object described herein may include an object, a human figure, an animal, and a background appearing in an image.

The deep neural network illustrated in FIG. 1 may indicate learning using an autoencoder. For example, the input image 110 may be indicated as "x" and the input image 110 may be input to the Layer v. The output image 190 identical to the input image 110 may be generated through various linear combinations and a nonlinear calculation. Each layer illustrated in FIG. 1 may be generated based on Equation 1.

$$h_j^i(x) = f\left(\sum_k W_{jk}^i h_k^{i-1}(x) + b_j^i\right)$$ [Equation 1]

In Equation 1, when an input image is "x," "$h_j^i(x)$" denotes a value of a j-th node of an i-th layer, "$W_{jk}^i$" denotes a k-th connection weight value to be connected to the j-th node of the i-th layer, and "$b_j^i$" denotes an offset of the j-th node of the i-th layer.

In addition, a function "f(x)" may be an activation function. Here, a nonlinear or linear function, for example, "f(x)=max (a,x)" and "f(x)=sigmoid (x)," may be used. For example, when the nonlinear function is used, various nonlinear transformations such as warping of a feature space may be enabled.

In Equation 1, "$h_j^1(x)=x$" may indicate a first layer, and a range of "k" and "i" may start with 2. When a total number of layers is n, the connection weight $W_{jk}^i$ of the neural network may be learned to allow "$h_j^n(x)$" corresponding to a last layer to be identical to an "x" corresponding to an input image of a first layer. Here, an error function may be expressed as Equation 2.

$$E = \sum_j \|h_j^n(x) - x_j\|^2 \quad \text{[Equation 2]}$$

The neural network may be learned to allow the error to be minimize using the error function expressed as Equation 2. For the minimization, differentiation of the connection weight $W_{jk}^i$ may be obtained using a backpropagation algorithm and the connection weight $W_{jk}^i$ may be updated according to a corresponding direction. Here, a chain rule may be used to obtain such a connection weight.

$$y = f\left(\sum_k W_{jk}^i h_k^{j-1}(x) + b_j^i\right) \quad \text{[Equation 3]}$$

$$net_j = W_{jk}^i h_k^{j-1}(x) + b_j^i \quad \text{[Equation 4]}$$

$$\frac{\partial E}{\partial w_i} = \frac{\partial E}{\partial y} \frac{\partial y}{\partial net} \frac{\partial net}{\partial w_i} \quad \text{[Equation 5]}$$

In Equation 3, "y" denotes an activated output of the i-th layer. Equation 5 may be expressed based on the chain rule. In Equation 4, "$net_j$" denotes a value based on an input and a sum of connection weights.

The autoencoder learning method may be repetitively applied by resetting, as an initial connection weight, the connection weight obtained through the learning described in the foregoing.

Although the learning of the neural network described with reference to FIG. 1 may be used herein, the learning is not limited thereto, and another neural network and image learning model may be used.

Figure 2:
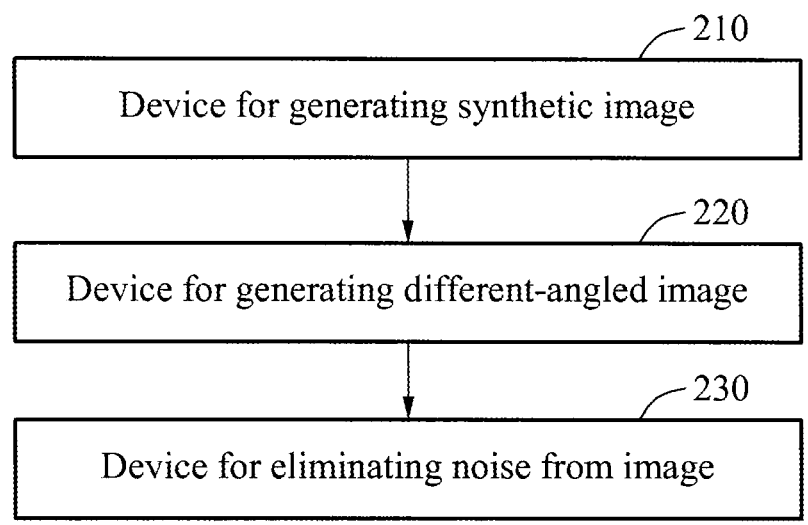
FIG. 2 is a diagram illustrating devices for generating an image according to at least one example embodiment.

FIG. 2 is a diagram illustrating devices for generating an image according to at least one example embodiment.

A self-learned neural network may be learned to achieve a desired result or a desired angle and generate an image at various angles using a single image. Thus, a user may not be required to directly search for a feature of the image and rotate the image at an angle. The neural network may output the result through self-learning.

For example, an output image may be generated from an input image to allow an object, for example, a face, to be the object at different angles. Thus, an image in which a pose of the object is changed may be generated. In addition, a recognition rate may be improved by augmenting a training set to be various forms in a recognition algorithm.

Referring to FIG. 2, a device 210 for generating a synthetic image, hereinafter also referred to as a synthetic image generating device 210, may generate a new synthetic image by receiving an existing image. A device 220 for generating a different-angled image, hereinafter also referred to as a different-angled image generating device 220, may generate a new output image in which an object included in an existing image is rotated at a different angle. A device 230 for eliminating noise from an image, hereinafter also referred to as a noise eliminating device 230, may eliminate noise from an input image using an image learning model.

The generating of the synthetic image may have an effect of augmenting data. When learning a face detection algorithm, a face detection rate and a recognition rate may be improved by generating a new face image in addition to a limited set of a face image.

The generating of the different-angled image may be applied to three-dimensional (3D) restoration technology, and enable a higher recognition rate by recognizing a face at different angles in addition to a signal angle. For example, an image may be generated for a new face at a new angle, and an object may be rotated from a certain angle to a desired target angle. Although the object is rotated at different angles, an image including the object having an identical identity may be generated. Further, various target images may be generated in addition to face rotation.

The eliminating of noise may increase a degree of definition of the image through edge sharpness. For example, subsequent to entire deblurring performed on an entire size, detailed deblurring may be performed on a small-sized local area.

Such devices may be provided in a form of hardware executing software or chip type hardware and installed in a mobile phone or a television (TV) to recognize an object, for example, a face. For example, such devices may be used for image recognition, face recognition, object recognition, user recognition, scene recognition, and the like for which simultaneous recognition of various sets of information is used.

For example, the different-angled image generating device 220 may generate an output image in which an object included in a new synthetic image generated by the synthetic image generating device 210 is expressed at a different angle, and the noise eliminating device 230 may eliminate noise from the output image in which the object is expressed at the different angle.

However, example embodiments described herein are not limited to the description provided. The synthetic image generating device 210, the different-angled image generating device 220, and the noise eliminating device 230 may operate autonomously, or at least two of the devices 210, 220 and 230 may operate in combination. In addition, a sequence of operations of the devices 210, 220, and 230 may be changed. A detailed operation of each device will be described hereinafter.

Figure 3:
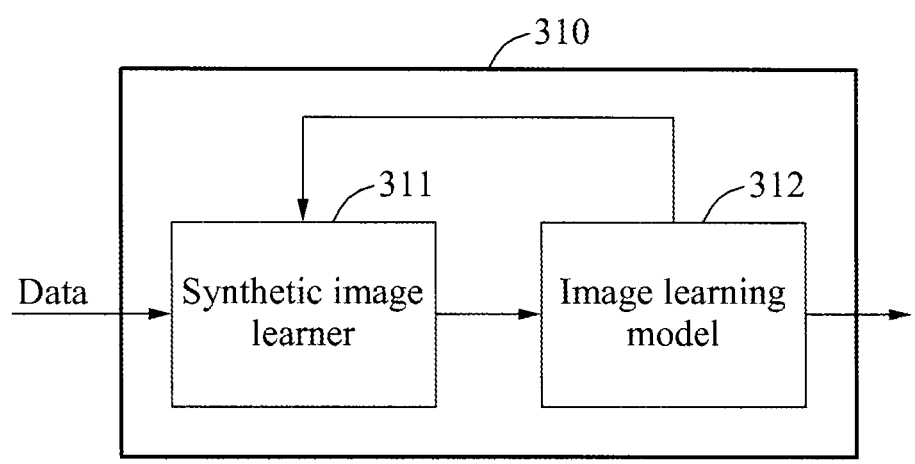
FIG. 3 is a diagram illustrating an example of a device for learning a synthetic image according to at least one example embodiment.

FIG. 3 is a diagram illustrating an example of a device 310 for learning a synthetic image according to at least one example embodiment.

Referring to FIG. 3, the device 310 for learning a synthetic image, hereinafter also referred to as a synthetic image learning device 310, includes a synthetic image learner 311 and an image learning model 312.

The synthetic image learner 311 may learn the image learning model 312 to allow an input and an output to be identical. For example, when the image learning model 312 is a neural network, the synthetic image learner 311 may learn a connection weight of the neural network using an autoencoder learning method. The connection weight may be learned as described with reference to FIG. 1. For example, the image learning model 312 may include the learned connection weight.

The image learning model 312 learned by the synthetic image learner 311 may be used in a synthetic image generating device 410 to be described with reference to FIG. 4.

Figure 4:
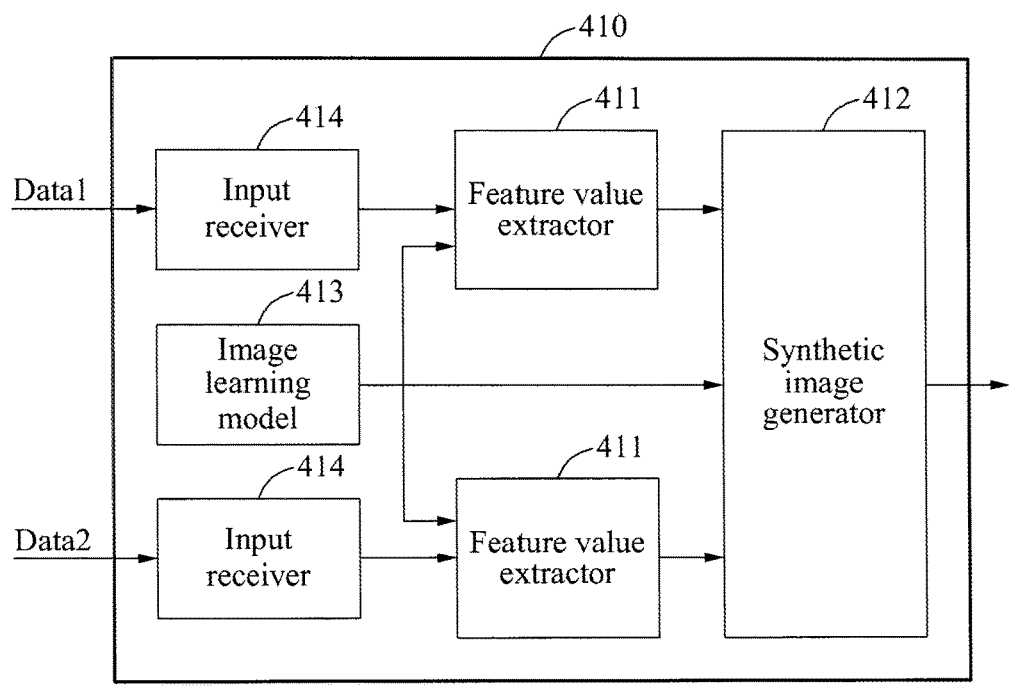
FIG. 4 is a diagram illustrating an example of a device for generating a synthetic image according to at least one example embodiment.

FIG. 4 is a diagram illustrating an example of the synthetic image generating device 410 according to at least one example embodiment.

Referring to FIG. 4, the synthetic image generating device 410 includes input receivers 414, feature value extractors 411, a synthetic image generator 412, and an image learning model 413.

The input receivers 414 may receive a plurality of input images. Although two input receivers are illustrated in FIG. 4, the number of input receivers is not limited thereto and thus, the number of input receivers corresponding to the number of the input images may be used as the input receivers 414. Alternatively, a single input receiver may receive the input images.

The feature value extractors 411 may extract a feature value corresponding to each input image using the image learning model 413 trained to allow an input and an output to be identical. The feature value may refer to a value indicating a feature of an image, and correspond to a node value of each layer in a neural network.

The synthetic image generator 412 may generate a synthetic image in which the input images are combined based on the feature value corresponding to each input image using the image learning model 413.

The connection weight determined as described with reference to FIG. 3 may be stored in the image learning model 413. The synthetic image generating device 410 may receive two input images, for example, Data 1 and Data 2. For example, the input images may be indicated as X1 and X2, respectively, and the number of all layers in the neural network included in the image learning model 413 may be 2N−1, wherein "N" denotes an integer greater than or equal to 1. The feature value extractors 411 may extract a feature value of an uppermost layer of the neural network based on Equation 1.

The synthetic image generator 412 may generate a new synthetic image by combining feature values of the uppermost layer extracted by each of the feature value extractors 411 and applying the combined feature value to the image learning model 413. The method of generating the synthetic image described in the foregoing will be further described with reference to FIG. 7.

Although the number of input images and the number of feature value extractors is two in FIG. 4, a plurality of input images may be received and a plurality of feature value extractors corresponding to the number of the input images may be used. Alternatively, a single feature value extractor may receive a plurality of input images and extract a feature value corresponding to each input image.

A detailed method of generating the synthetic image will be described with reference to FIGS. 5 through 7.

Figure 5:
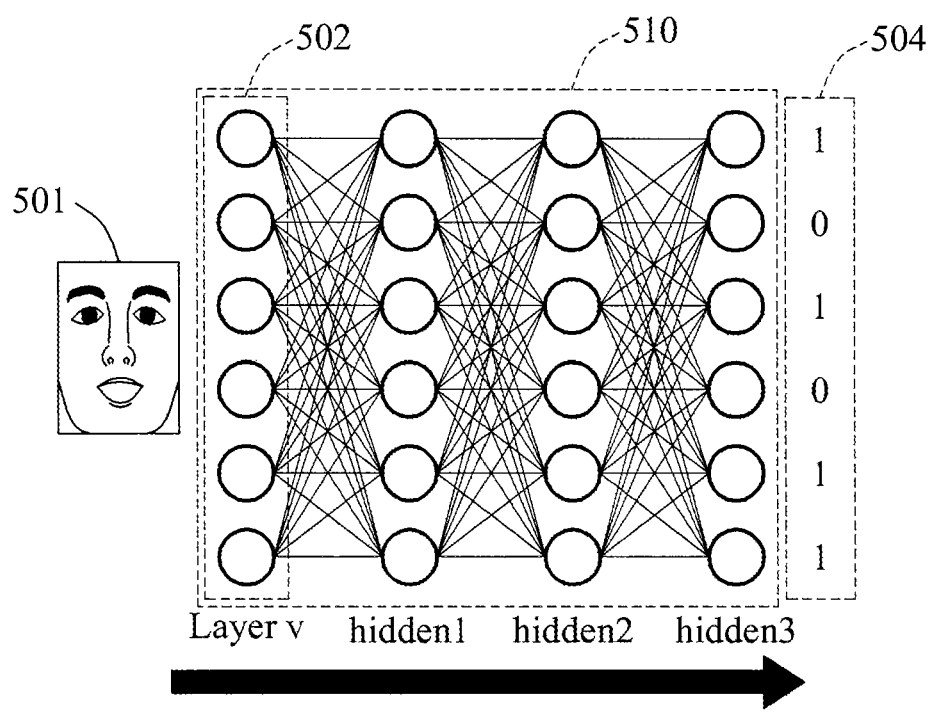
FIGS. 5 through 7 illustrate an example of generating a synthetic image according to at least one example embodiment.
Figure 6:
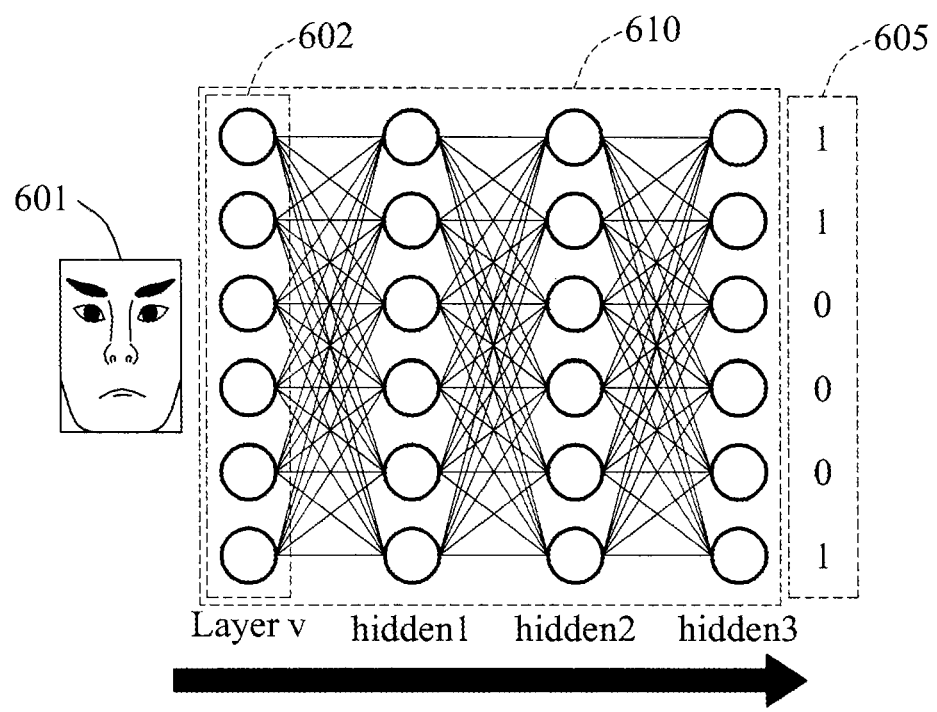
Figure 7:
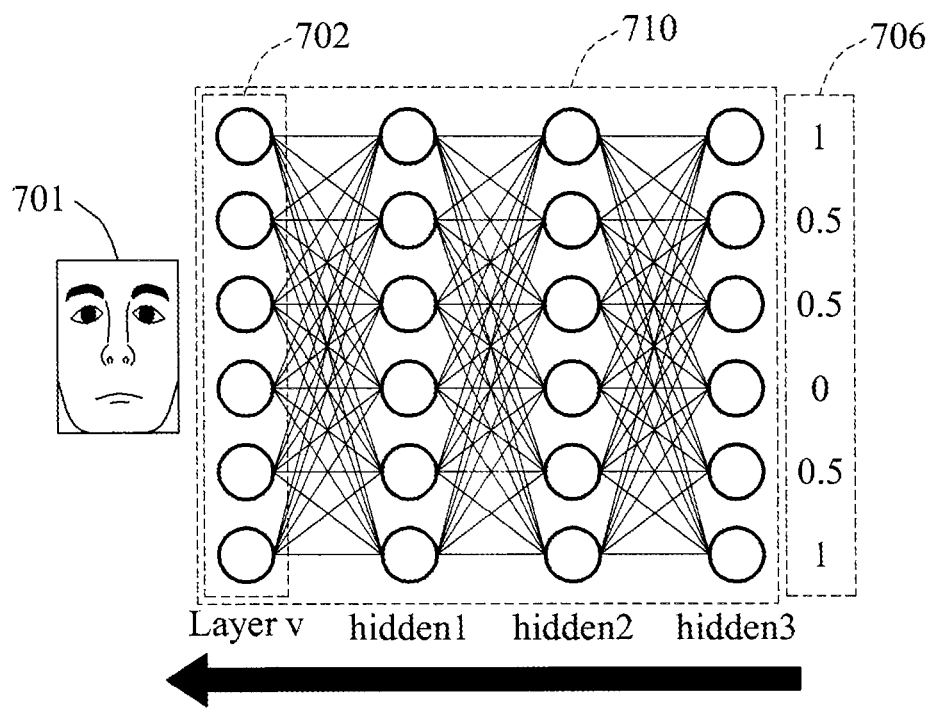

FIGS. 5 through 7 illustrate an example of generating a synthetic image according to at least one example embodiment.

Referring to FIGS. 5 and 6, $h_j^N(X1)$ $h_j^N(X2)$ corresponding to a feature value 504 and a feature value 605 of uppermost layers of an input image X1 501 and an input image X2 601 may be extracted by the feature value extractors 411 of FIG. 4. For example, the input image X1 501 and the input image X2 601 may be input to an input layer 502 and an input layer 602 of a neural network 510 and a neural network 610, respectively, included in image learning models. The feature value extractors 411 may extract the feature value 504 and the feature value 605 from the uppermost layers of the neural network 510 and the neural network 610. The feature value 504 and the feature value 605 and the number of feature values illustrated in FIGS. 5 and 6 are provided only as an illustrative example and thus, the feature values and the number of feature values may be changed depending on a design. Here, the feature value 504 and the feature value 605 may be provided to the synthetic image generator 412 of FIG. 4.

Referring to FIG. 7, the synthetic image generator 412 of FIG. 4 may combine feature values of uppermost layers extracted from each input image. The synthetic image generator 412 may generate a synthetic image 701 in which the input image X1 501 of FIG. 5 and the input image X2 601 of FIG. 6 are combined to an output layer 702 of a neural network 710 based on a combined feature value 706.

For example, the synthetic image 701 may be restored based on the feature value 706 generated through a linear combination of the feature values of the uppermost layers corresponding to the two input images, for example, the input image X1 501 and the input image X2 601, and a connection weight of the learned neural network 710. The generation of the synthetic image 701 may be expressed as Equation 6.

$$h_j'^{i-1}(x) = f\left(\sum_k W_{jk}'^i h_k'^i(x) + b_j'^i\right)$$ [Equation 6]

In Equation 6, when an input is "x," "$h_j'^i(x)$" denotes a value of a j-th node of an i-th layer, "$W_{jk}'^i$" denotes a k-th connection weight to be connected to the j-th node of the i-th layer, and "$b_j'^i$" denotes an offset of the j-th node of the i-th layer. Here, "$W'^i$" and "$b'^i$" may indicate a weight matrix and an offset of the i-th layer, respectively, to restore the synthetic image 701 from the feature value 706 through reverse mapping. Thus, Equation 6 may indicate the method of generating the synthetic image 701 from the given feature value 706 by calculating a node value from an upper layer to a lower layer.

A node value of an uppermost layer may be indicated as $h_k'^N(x)=k*h_j^N(X1)+(1−k)*k_j^N(X2)$ based on Equation 6, and $h_j'^1(x)$ may be obtained. $h_j'^1(x)$ may be a feature value of a restored single image and thus, indicate the new synthetic image 701 in which the input images are combined.

Figure 8:
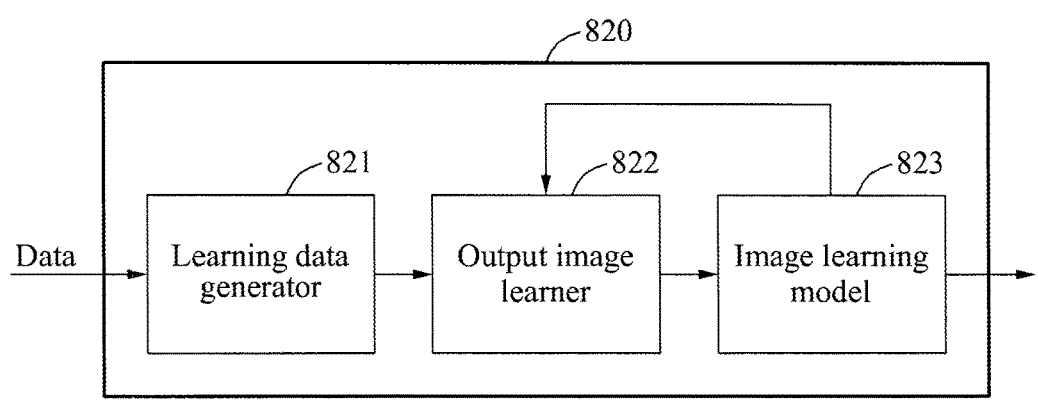
FIGS. 8 and 9 are diagrams illustrating an example of a device for learning a different-angled image according to at least one example embodiment.
Figure 9:
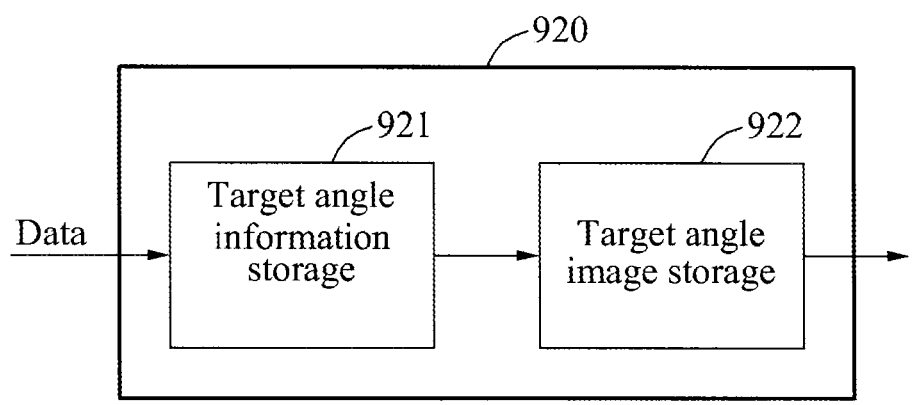

FIGS. 8 and 9 are diagrams illustrating an example of a device for learning a different-angled image according to at least one example embodiment.

Referring to FIG. 8, a device for learning a different-angled image, hereinafter also referred to as a different-angled image learning device 820, may learn a connection weight included in an image learning model 823 using learning data generated with respect to angles. The learned connection weight may be used to generate a new angled image.

As illustrated in FIG. 8, the different-angled image learning device 820 includes a learning data generator 821, an output image learner 822, and the image learning model 823.

The learning data generator 821 may generate the learning data associated with angles. For example, when the learning data generator 821 receives data, the learning data generator 821 may convert the data to the learning data through a learning data generation algorithm, which will be described in detail with reference to FIG. 9.

The output image learner 822 may perform a learning algorithm to search for a connection weight using the generated learning data, and the found connection weight may be used again as an initial connection weight. Through the iteration described in the foregoing, a final connection weight may be obtained. Although the image learning model 823 may perform learning by applying a method similar to the learning method described with reference to FIG. 1, an input and an output may be dissimilar to those described with reference to FIG. 1. A value of each node of the image learning model 823 and an error function in the output image learner 822 may be expressed as Equations 7 and 8.

$$h^i_j(x) = f\left(\sum_k W^i_{jk} h^{i-1}_k(x) + b^i_j\right)$$ [Equation 7]

$$E = \sum_j \|h^i_j(x) - y_j\|^2$$ [Equation 8]

In Equations 7 and 8, "x" and "y" denote an input image and an output image, respectively. The error function of Equation 7 may compare an output of a final layer to y.

FIG. 9 is a diagram illustrating an example of a learning data generator 920 according to at least one example embodiment.

Referring to FIG. 9, the learning data generator 920 includes a target angle information storage 921 and a target angle image storage 922. The target angle information storage 921 may store angle information. The target angle image storage 922 may store an image corresponding to each set of the angle information.

In a learning process, an input image, for example, an image including a human face, and information on a target angle, for example, a desired angle of an object to be output, may be used as an input. In addition, the image corresponding to the information on the target angle, for example, an image including the object corresponding to the desired angle to be output, may be used as an output. For example, angle information corresponding to a total of k target angles may be generated using a single set of image data, and a total of k pairs of learning data may be generated using a single image to allow an image corresponding to each set of the angle information to be output. Here, "k" denotes an integer greater than or equal to 1.

For example, the input and the output described in the foregoing may be a frontal image of the object and angle information corresponding to 30°, and an image corresponding to 30° of the object, respectively. The input and the output may be the frontal image of the object and angle information corresponding to 60°, and an image corresponding to 60° of the object, respectively. The input and the output may be the frontal image of the object and angle information corresponding to 90°, and an image corresponding to 90° of the object, respectively.

$$M_{i,j} \in R^{1 \times d}$$ [Equation 9]

$$t_{i,j} \in \{1, 2, \ldots p\}$$ [Equation 10]

The generating of the learning data may be performed to search for X and Y corresponding to the input and the output. In Equations 9 and 10, when images captured at p angles per person of n individuals are present in a previously stored data set and "M" indicates the images, "$M_{i,j}$" indicates an image captured at a j-th angle for an i-th person. In addition, "$t_{i,j}$" indicates angle information corresponding to the image $M_{i,j}$, for example, an angle at which an object is rotated from a front side of the image, and may be expressed in a unit of a degrees (°).

Here, "p" denotes the number of all angle classes, and "d" denotes a dimension of an image. A code, $q\varepsilon\{0,1\}^{1 \times (p*5)}$, of Equation 11 may indicate angle information as a form of a code. In Equation 11, "j" denotes a bit of the angle information. The target angle information storage 921 may store the angle information based on Equation 11.

$$q^j(t) = \begin{cases} 1 & \text{if } 5*(t-1)+1 \leq j \leq 5*t \\ 0 & \text{else} \end{cases}$$ [Equation 11]

A total of p pairs of the input and the output may be generated from the code for a single image $M_{i,j}$. The target angle image storage 922 may store an image corresponding to each set of the angle information. A t-th input $X_{i,j}^t$ and a t-th output $Y_{i,j}^t$ that may be generated through the $M_{i,j}$ may be expressed as Equations 12 and 13, respectively.

$$X_{i,j}^t = [M_{i,j} q(t)]$$ [Equation 12]

$$Y_{i,j}^t = [M_{i,t}]$$ [Equation 13]

"$X \in R^{(n*p*p) \times (d+p*5)}$" and "$Y \in R^{(n*p*p) \times (d)}$," which are generated through the equations, may be a new data set, for example, learning data, and used in the output image learner 822 of FIG. 8.

When a normal with respect to a plane of an input image is an x-axis, the angle indicated by the angle information described with reference to FIG. 9 may be an angle expressed based on a z-axis. However, the angle indicated by the angle information described herein is not limited to the angle expressed based on the z-axis in an xyz coordinate system and thus, the angle may be expressed as an angle based on the x-axis and a y-axis. Further, all axes or any axis in other coordinate systems may be used to express the angle. For example, the angle information may be expressed as various forms such as roll, yaw, and pitch.

Figure 10A:
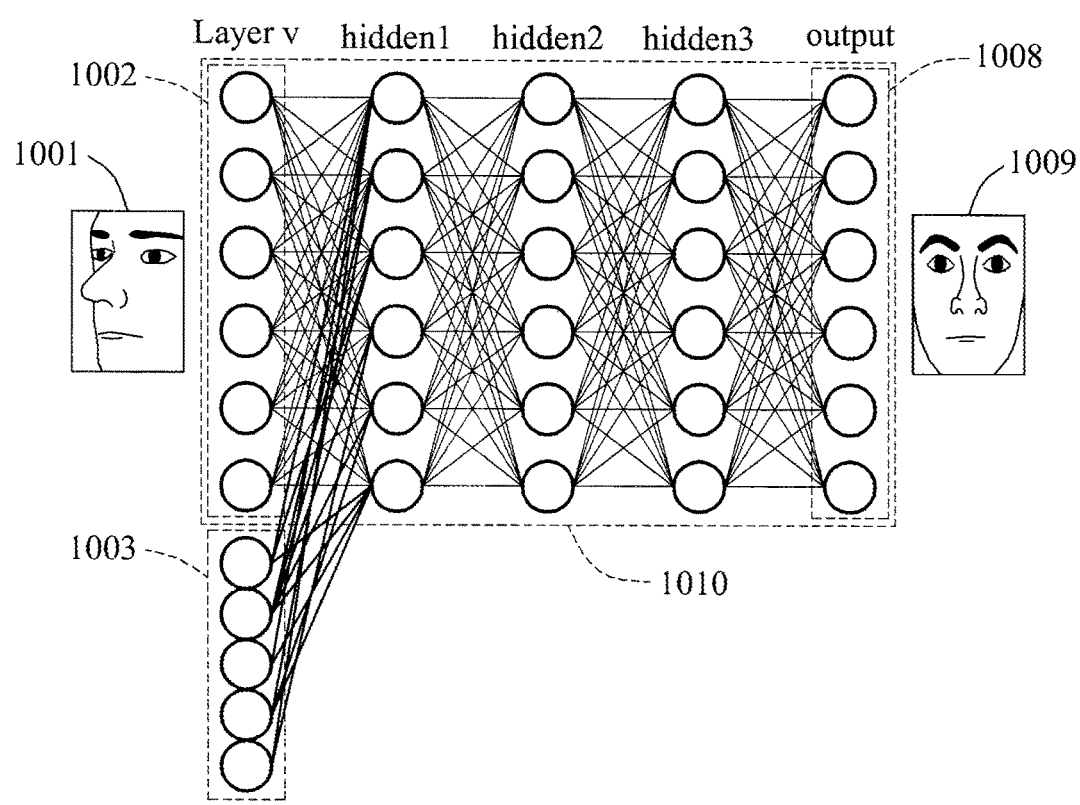
FIG. 10A illustrates an example of learning a different-angled image according to at least one example embodiment.

FIG. 10A illustrates an example of learning a different-angled image according to at least one example embodiment.

A different-angled image learning device may receive an input image 1001 and angle information 1003 corresponding to Equation 12 provided in the foregoing through an input layer 1002 of a first neural network 1010. An output layer 1008 may receive an output image 1009 corresponding to Equation 13 provided in the foregoing. A connection weight of the first neural network 1010 may be learned based on the input image 1001, the angle information 1003, and the output image 1009 corresponding to the angle information 1003.

Referring to FIG. 10A, the input image 1001 includes a face facing a certain direction, and the output image 1009 includes a face facing a frontward direction. The angle information 1003 to be input may include an angle corresponding to a front side.

A learning method using a learning data generation algorithm may be applicable to various fields in addition to generation of a new angle image.

For example, when learning is performed by adding information on a desired accessory to a front image and adding an image of a face wearing the accessory to an output image, and a new face image is added and the information on the accessory is input, the image of the face wearing the desired accessory may be output.

For another example, when learning is performed by adding information on a desired makeup to a front image and adding an image of a face wearing the makeup to an output image, and a new face image is added and the information on the makeup is input, the image of the face wearing the desired makeup may be output.

Figure 10B:
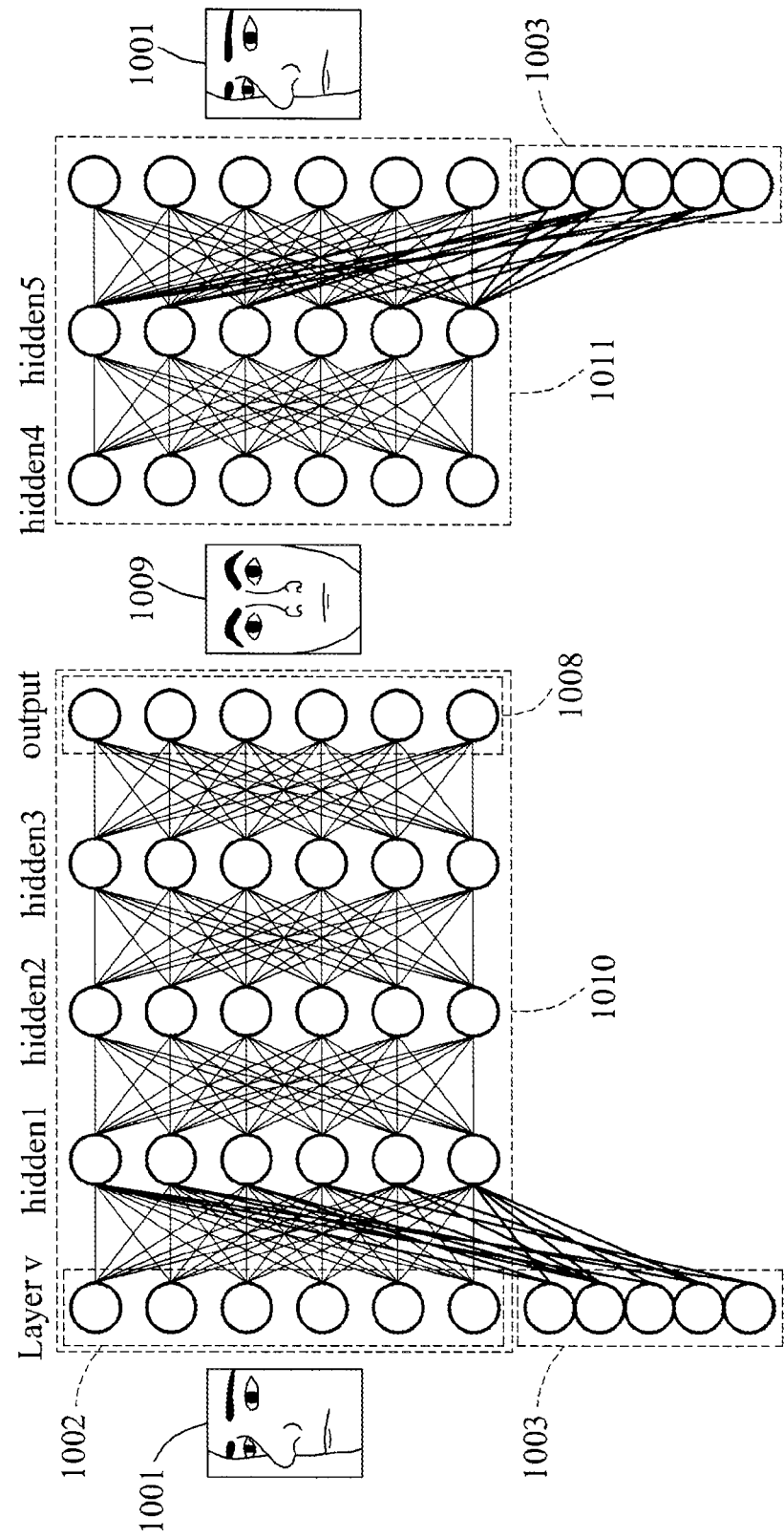
FIG. 10B illustrates an example of learning based on a different-angled image along with a unique identity according to at least one example embodiment.

FIG. 10B illustrates an example of learning based on a different-angled image along with a unique identity according to at least one example embodiment.

A different-angled image learning device may receive an input image 1001 and angle information 1003 corresponding to Equation 12 provided in the foregoing through an input layer 1002 of the first neural network 1010. An output layer 1008 may receive an output image 1009 corresponding to Equation 13 provided in the foregoing. A connection weight of the first neural network 1010 may be learned based on the input image 1001, the angle information 1003, and the output image 1009 corresponding to the angle information 1003.

Subsequently, a second neural network 1011 may be learned to allow the input image 1001 and the angle information 1003 to be output in response to the output image 1009.

Thus, the different-angled image learning device may be learned to allow an identity of the output image 1009 corresponding to the input image 1001 to be maintained.

The different-angled image learning device may update connection weights of connection lines of the first neural network 1010 and the second neural network 1011 through second learning. For example, the different-angled image learning device may apply iterative learning to the neural networks. For an entire neural network including the first neural network 1010 and the second neural network 1011, the different-angled image learning device may simultaneously perform first updating, which may be performed in the first neural network 1010, to learn connection weights with respect to the input image 1001, the angle information 1003, and the output image 1009 corresponding to the angle information 1003, and second updating, which may be performed in the second neural network 1011, to learn connection weights to allow the output image 1009 corresponding to the angle information 1003 to be maintained identical to the input image 1001. For example, the different-angled image learning device may update connection weights among artificial neurons included in the entire neural network through backpropagation learning, which is a neural network learning method.

Figure 11:
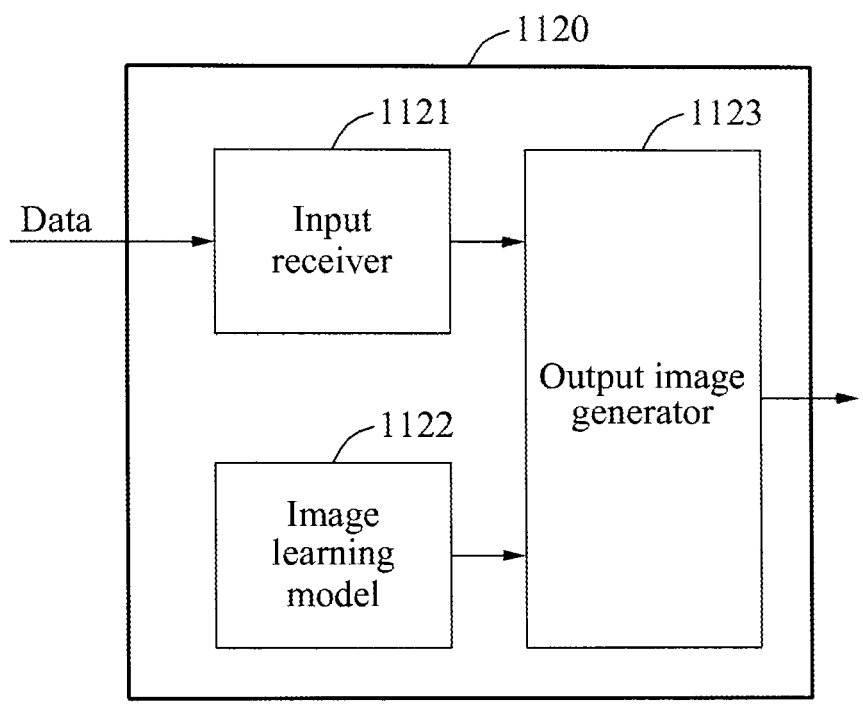
FIG. 11 is a diagram illustrating an example of a device for generating a different-angled image according to at least one example embodiment.

FIG. 11 is a diagram illustrating an example of a device 1120 for generating a different-angled image according to at least one example embodiment.

Referring to FIG. 11, the device 1120 for generating a different-angled image, hereinafter also referred to as a different-angled image generating device 1120, includes an input receiver 1121, an image learning model 1122, and an output image generator 1123.

The input receiver 1121 may receive an input image including an object and angle information. For example, the object may include a human face.

The image learning model 1122 may include a neural network including at least one layer connected to another through a connection line having a connection weight. For example, the connection weight of the neural network may be learned to allow a second reference angle image to be output based on a second angle and a first reference angle image. Here, the connection weight included in the image learning model 1122 may be identical to the connection weight determined in the image learning model 823 of FIG. 8.

The output image generator 1123 may generate an output image including the object based on the input image and the angle information using the image learning model 1122 trained in pairs of images corresponding to different angles.

The pairs of images may include the first reference angle image corresponding to a first angle and the second reference angle image corresponding to the second angle. The first reference angle image and the second reference angle image may include an identical reference object. For example, the angle information may include information associated with an angle predetermined for the object included in the output image. The first reference angle image, the second reference angle image, and the reference object may be a training set.

The output image generator 1123 may generate the output image obtained by converting the input image to correspond to the angle information using the image learning model 1122. For example, the output image may include the object obtained by rotating an angle of the object included in the input image in response to the angle information.

Figure 12:
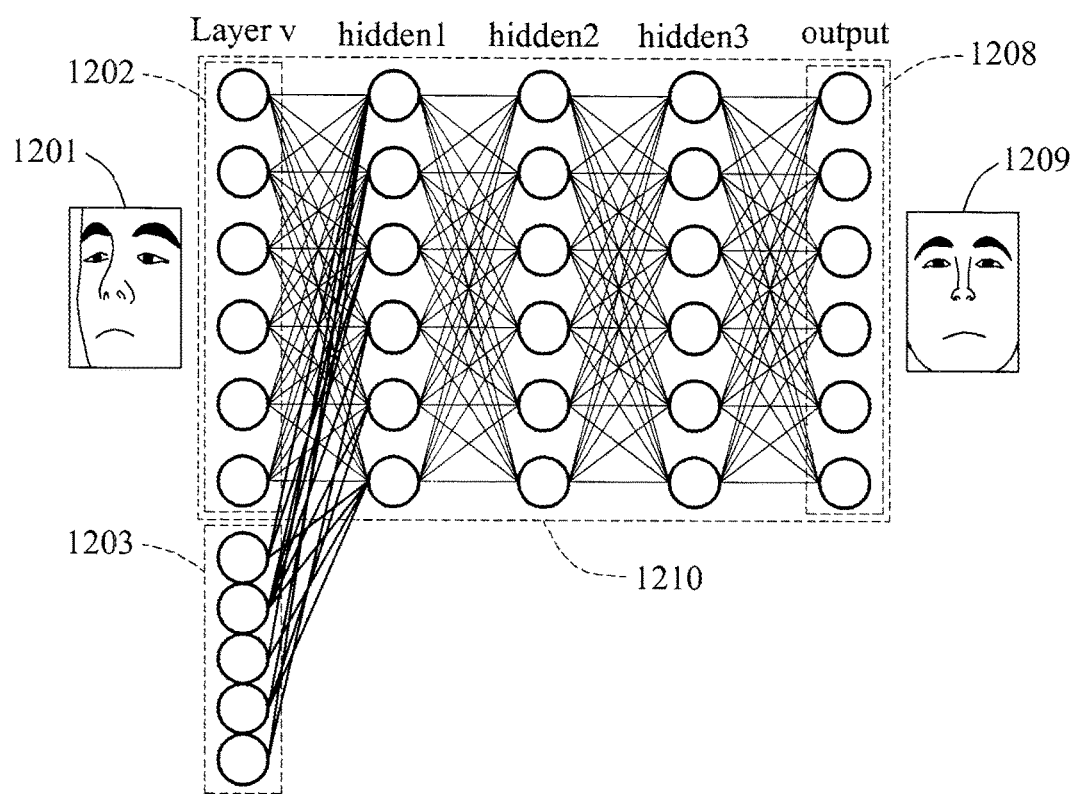
FIG. 12 illustrates an example of generating a different-angled image according to at least one example embodiment.

FIG. 12 illustrates an example of generating a different-angled image according to at least one example embodiment.

Referring to FIG. 12, a neural network 1210 may receive, through an input layer 1202, a code 1203 corresponding to a front side along with an input image 1201 in which a 45°-angled object is exhibited. An image learning model, for example, the neural network 1210, may generate, in an output layer 1208, an output image 1209 in which the front side of the object is exhibited using a pre-learned connection weight. The learned first neural network 1010 of FIG. 10A may be used as the neural network 1210.

For example, angle information may indicate an image in which the object is rotated at 45° to a right direction as "10000," an image in which the object is rotated at 30° to the right direction as "01000," an image in which the object faces a front side as "00100," an image in which the object is rotated at 45° to a left side as "00010," and an image in which the object is rotated at 90° to the left side as "00001." However, the angle information is not limited to such an example. The angle information may be indicated as n bits, and include a plurality of angles.

The input image 1201, the output image 1209, and the angle information is not limited to the example illustrated in FIG. 12. Each image may include various types of objects and the angle information may be a set of information corresponding to an angle within a range of 0° to 360°.

The neural network 1210 may generate the output image 1209 in which an identity of the object included in the input image 1201 is maintained and the angle is changed with respect to the input image 1201 having the identity different from the input image 1001 used for the learning described with reference to FIG. 10A.

In addition, the learned first neural network 1010 of FIG. 10B may be used as the neural network 1210. In such a case, the second neural network 1011 of FIG. 10B may not be used to generate the output image 1209.

Figure 13:
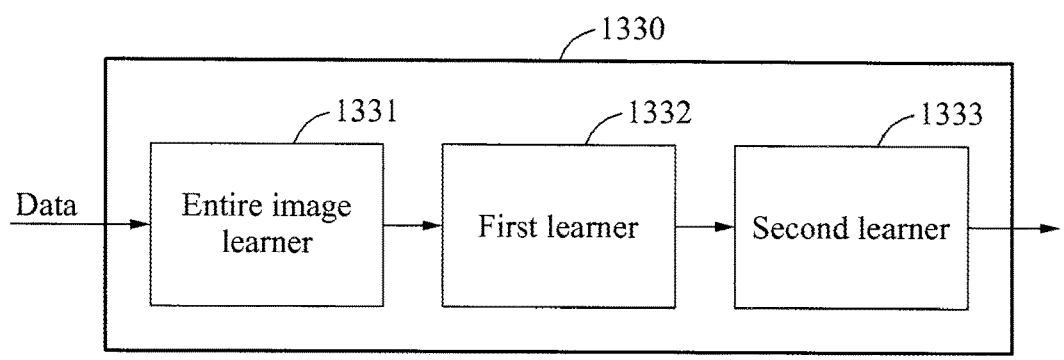
FIG. 13 is a diagram illustrating an example of a device for learning elimination of noise from an image according to at least one example embodiment.

FIG. 13 is a diagram illustrating a device 1330 for learning elimination of noise from an image according to at least one example embodiment.

The image generated based on the descriptions provided with reference to FIGS. 1 through 12 may be blurred to be output. The device 1330 may learn, through a neural network, an image including noise and an image from which noise is eliminated and deblur the blurred image.

Referring to FIG. 13, the device 1330 includes an entire image learner 1331, a first learner 1332, and a second learner 1333. For example, noise may not be completely eliminated by performing denoising one time. Thus, a denoising effect may be improved by performing the denoising on patches by size.

When data to which noise is applied and data from which noise is absent are input, the entire image learner 1331 may be trained to allow the data to which the noise is applied to be output as the data from which the noise is absent through learning. For example, the entire image learner 1331 may learn a connection weight for the neural network.

When a first size patch, for example, ¼ of entire noise data, is input, the first learner 1332 may be trained, using the data to which the noise is applied and the data from which the noise is absent, which are an output from the entire image learner 1331, to allow a region of the data from which the noise is absent corresponding to the first size patch to be output. For example, the first learner 1332 may learn a connection weight for the neural network.

The second learner 1333 may learn a second size denoising autoencoder, for example, ¹⁄₁₆, based on the output from the first learner 1332 by applying the method similar to the method applied to the entire image learner 1331 and the first leaner 1332.

Thus, the connection weight of the entire image, the connection weight of the first size, for example, a ¼ patch size, and the connection weight of the second size, for example, a ¹⁄₁₆ patch size, may be learned.

For example, the input to the entire image leaner 1331 may be the entire image including noise and the output from the entire image leaner 1331 may be an image without the noise. The input to the first learner 1332 may be a ¼ size patch of the image including noise, and the corresponding output from the first learner 1332 may be an image patch from which the noise is absent at a same position. The input to the second learner 1333 may be a ¹⁄₁₆ size patch of the image including noise, and the corresponding output from the second learner 1333 may be an image patch from which the noise is absent at a same position. The connection weights may be learned based on such pairs of the input and the output by applying a method similar to the method described with reference to FIG. 3.

Figure 14:
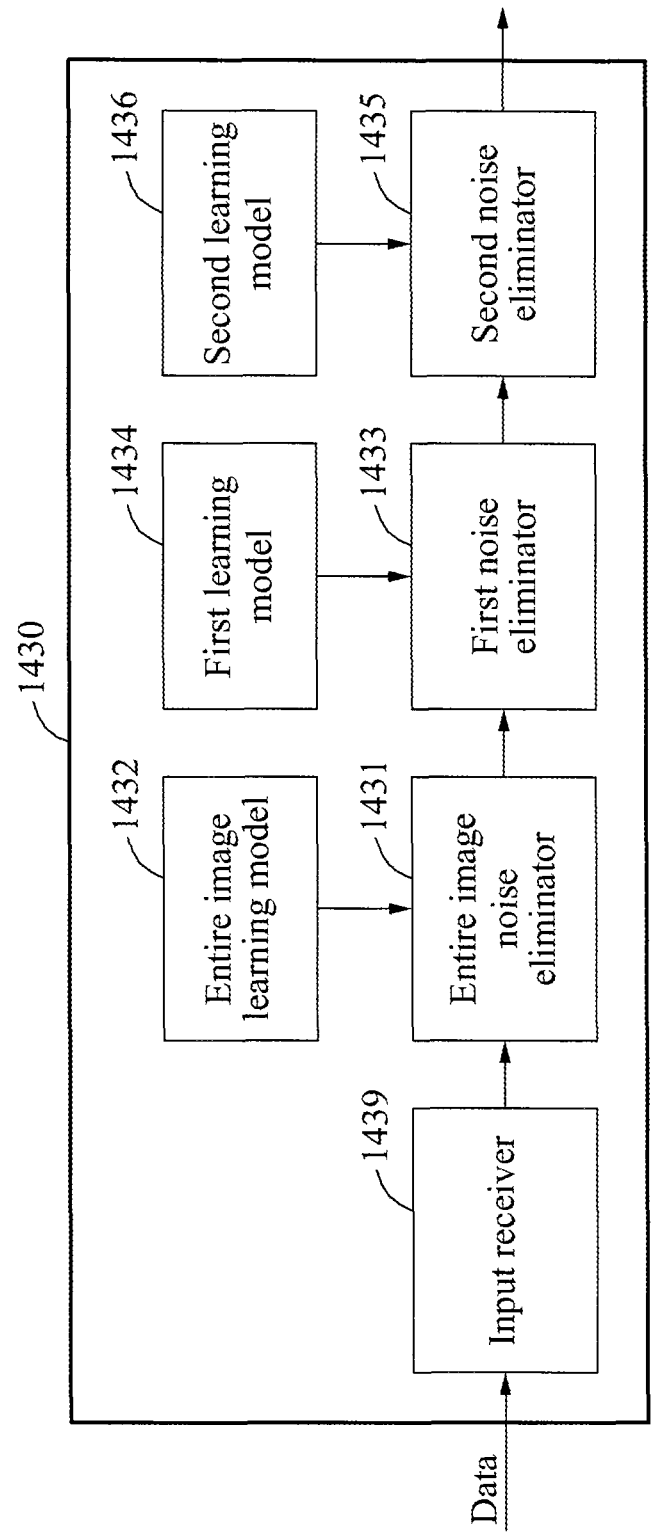
FIG. 14 is a diagram illustrating an example of a device for eliminating noise from an image according to at least one example embodiment.

FIG. 14 is a diagram illustrating a device 1430 for eliminating noise from an image according to at least one example embodiment.

Referring to FIG. 14, the device 1430 for eliminating noise, hereinafter also referred to as a noise eliminating device 1430, includes an input receiver 1439, an entire image noise eliminator 1431, an entire image learning model 1432, a first noise eliminator 1433, a first learning model 1434, a second noise eliminator 1435, and a second learning model 1436.

For example, the input receiver 1439 may receive an input image. Each noise eliminator, for example, the entire image noise eliminator 1431, the first noise eliminator 1433, and the second noise eliminator 1435, of the noise eliminating device 1430 may generate an output image obtained by eliminating noise from the input image, using at least one image learning model trained in elimination of image noise from at least one patch of a predetermined size.

For example, the image learning model may include a neural network including at least one layer connected to another through a connection line having a connection weight. The connection weight may be learned to allow a predetermined size patch of a reference output image from which noise is eliminated to be generated from the predetermined size patch of a reference input image including the noise.

The image learning model may include the entire image learning model 1432 to be learned to allow the reference output image from which the noise is eliminated to be generated from the reference input image including the noise. For example, the entire image noise eliminator 1431 may eliminate noise from the input image using the entire image learning model 1432.

In addition, the image learning model may include the first learning model 1434 to be learned to allow a predetermined first size patch of the reference output image from which noise is eliminated to be generated from the first size patch of the reference input image including the noise, and the second learning model 1436 to be learned to allow a predetermined second size patch of the reference output image from which noise is eliminated to be generated from the second size patch of the reference input image including the noise. For example, the first noise eliminator 1433 may eliminate the noise in a unit of the first size patch using the first learning model 1434. The second noise eliminator 1435 may eliminate the noise in a unit of the second size patch using the second learning model 1436.

For example, the entire image noise eliminator 1431 may eliminate the noise from an entire region using a connection weight associated with elimination of the noise from the entire image, which is learned through the method described with reference to FIG. 13. The first noise eliminator 1433 may eliminate the noise by convoluting an image including noise output from the entire image noise eliminator 1431 using a connection weight of the first size, for example, ¼. The second noise eliminator 1435 may eliminate the noise by convoluting an image including noise output from the first noise eliminator 1433 using a connection weight of the second size, for example ¹⁄₁₆.

"f0," "f1," and "f2" to be described hereinafter may be a function for generating an output in response to an input "X" by the entire image noise eliminator 1431, the first noise eliminator 1433, and the second noise eliminator 1435, using the connection weight learned with reference to FIG. 13. For example, the input X may have an n×m dimension.

The output from the entire image noise eliminator 1431 may be expressed as Equation 14.

$$X1 = f0(X) \in R^{n \times m} \qquad \text{[Equation 14]}$$

The first noise eliminator 1433 operating using "X1" of Equation 14 may operate as indicated in a code of Table 1.

TABLE 1

Patchsize = p
For i = 1:n–p
For j = 1:m–p
Y(i:i+p,j:j+p) = F(X(i:i+p,j:j+p))
end
end In Table 1, when X is X1, Y is X2, and F is f1, Equation 15 may be obtained.

$$X2 = f1(X1) \in R^{n \times m} \qquad \text{[Equation 15]}$$

The output from the first noise eliminator 1433 may be obtained based on Equation 15. In Equation 15, a size of a patch, for example, "Patchsize" may be indicated as "min (n/2, m/2)."

When X is X2, Y is X3, F is f2, and "Patchsize" is min(n/4, m/4), the second noise eliminator 1435 may output Equation 16.

$$X3 = f2(X2) \in R^{n \times m} \qquad \text{[Equation 16]}$$

In Equation 16, "X3" may be generated as a final image from which noise is finally eliminated.

The number of operations of eliminating noise is not limited to the examples described herein and thus, at least l noise eliminators may be included and a size of a patch may be changed as necessary. Here, "l" may be an integer greater than or equal to 1.

FIGS. 15 through 18 illustrate an example of eliminating noise from an image according to at least one example embodiment.

Figure 15:
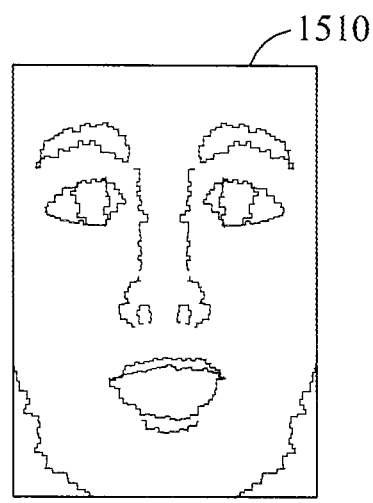
FIGS. 15 through 18 illustrate an example of eliminating noise from an image according to at least one example embodiment.
Figure 16:
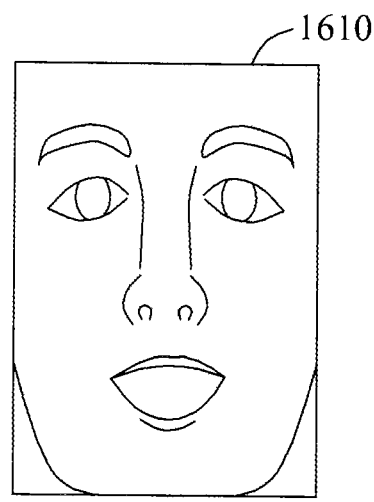

FIG. 15 illustrates an input image 1510 including noise. The entire image noise eliminator 1431 of FIG. 14 may eliminate the noise from the input image 1510 and thus, an output image 1610 deblurred as illustrated in FIG. 16 may be generated.

Figure 17:
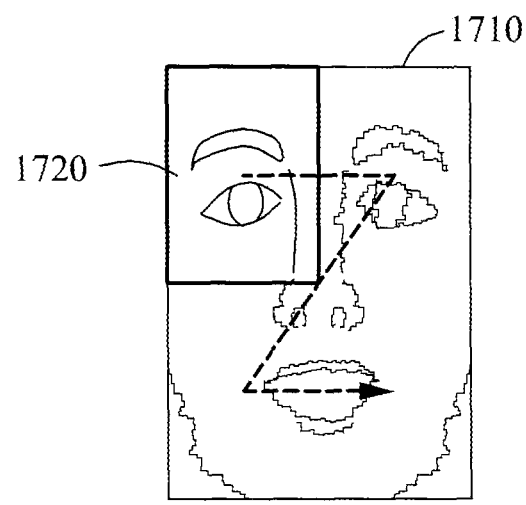

FIG. 17 illustrates an example of eliminating noise by the first noise eliminator 1433 of FIG. 14 in a unit of a patch 1720 of a first size predetermined with respect to an input image 1710 using an image learning model, for example, a neural network. For example, the noise may be sequentially eliminated in the unit of the illustrated patch size according to a direction pointed by an arrow.

Figure 18:
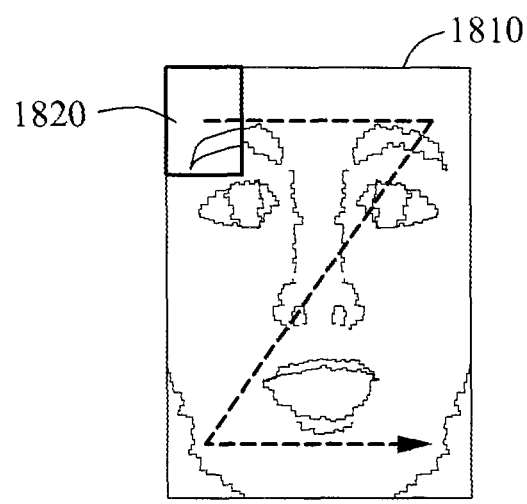

FIG. 18 illustrates an example of eliminating noise by the second noise eliminator 1435 of FIG. 14 in a unit of a patch 1820 of a second size predetermined with respect to an input image 1810 using an image learning model, for example, a neural network. For example, the noise may be sequentially eliminated in the unit of the illustrated patch size according to a direction pointed by an arrow.

The operations of eliminating the noise described with reference to FIGS. 15 through 18 may be sequentially performed. However, the order of the operations is not limited to the examples described with reference to FIGS. 15 through 18 and thus, may be changed as necessary. In addition, a direction of eliminating the noise is not limited to the directions pointed by the arrows illustrated in FIGS. 17 and 18 and thus, may be changed based on a design.

Figure 19:
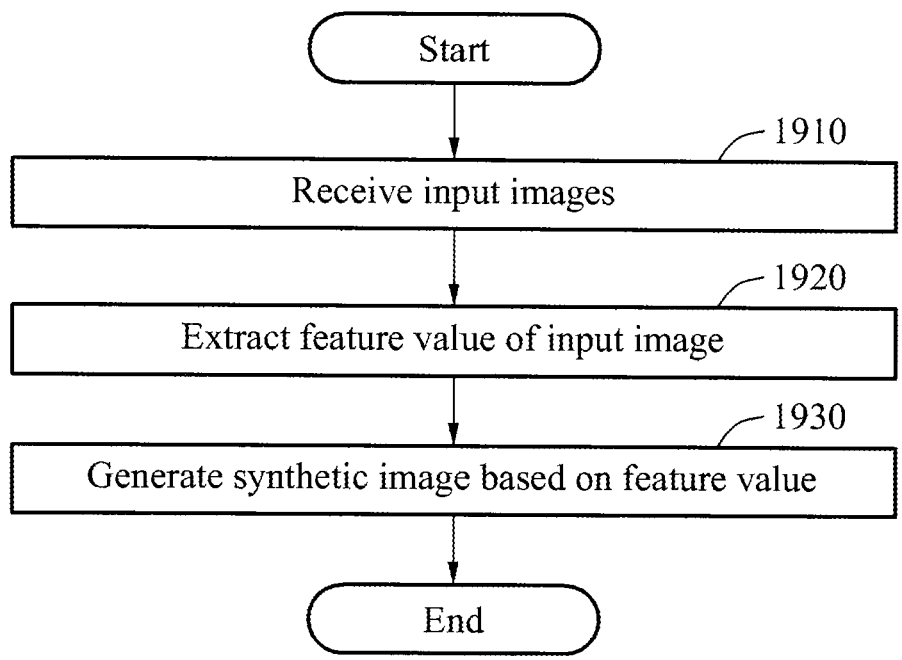
FIG. 19 is a flowchart illustrating an example of a method of generating a synthetic image according to at least one example embodiment.

FIG. 19 is a flowchart illustrating a method of generating a synthetic image according to at least one example embodiment.

Referring to FIG. 19, in operation 1910, an input receiver receives a plurality of input images through an input layer. The input images may include face images of different individuals. For example, the input images may be sequentially received.

In operation 1920, a feature value extractor extracts a feature value of an input image. For example, the feature value extractor may extract a feature value corresponding to each input image using an image learning model trained to allow an input and an output to be identical. The feature value extractor may extract a feature value corresponding to an uppermost layer of a neural network from each input image.

In operation 1930, a synthetic image generator generates a synthetic image based on the feature value. For example, the synthetic image generator may generate the synthetic image in which the input images are combined based on the feature value corresponding to each input image using the image learning model.

The synthetic image generator may combine feature values corresponding to the input images. For example, the synthetic image generator may combine the feature values corresponding to the input images at a predetermined ratio. In addition, the synthetic image generator may generate the synthetic image based on the combined feature value using the neural network.

The image learning model may include the neural network including at least one layer connected to another through a connection line having a connection weight. The connection weight may be learned to allow an error between a reference input image and an output image corresponding to the reference input image to be minimized.

Figure 20:
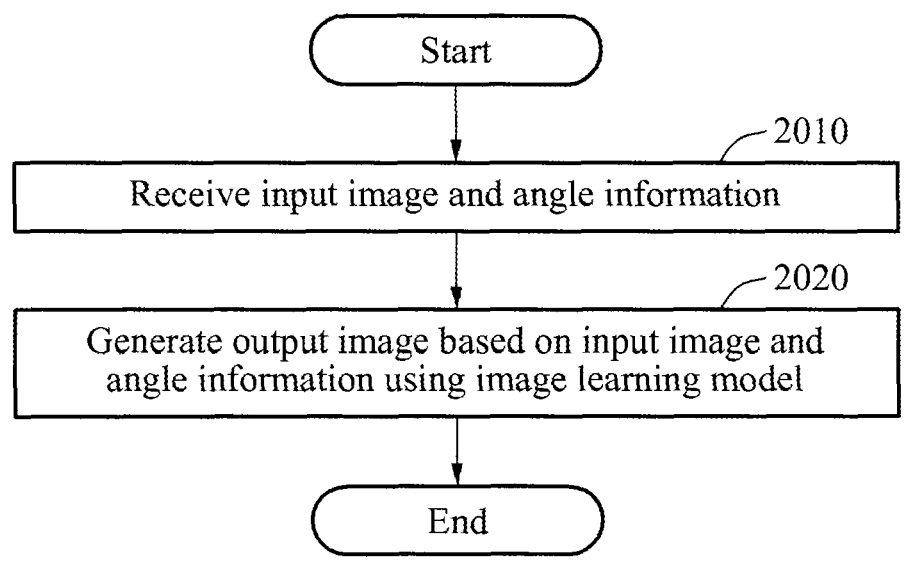
FIG. 20 is a flowchart illustrating an example of a method of generating a different-angled image according to at least one example embodiment.

FIG. 20 is a flowchart illustrating a method of generating a different-angled image according to at least one example embodiment.

Referring to FIG. 20, in operation 2010, an input receiver receives an input image and angle information. For example, the input receiver may receive the input image including an object and the angle information.

In operation 2020, an output image generator generates an output image based on the input image and the angle information using an image learning model. For example, the output image generator may generate the output image including the object based on the input image and the angle information using the image learning model trained in pairs of images corresponding to different angles.

For a detailed description of operations 2010 and 2020, reference may be made to the description provided with reference to FIGS. 8 through 12.

Figure 21:
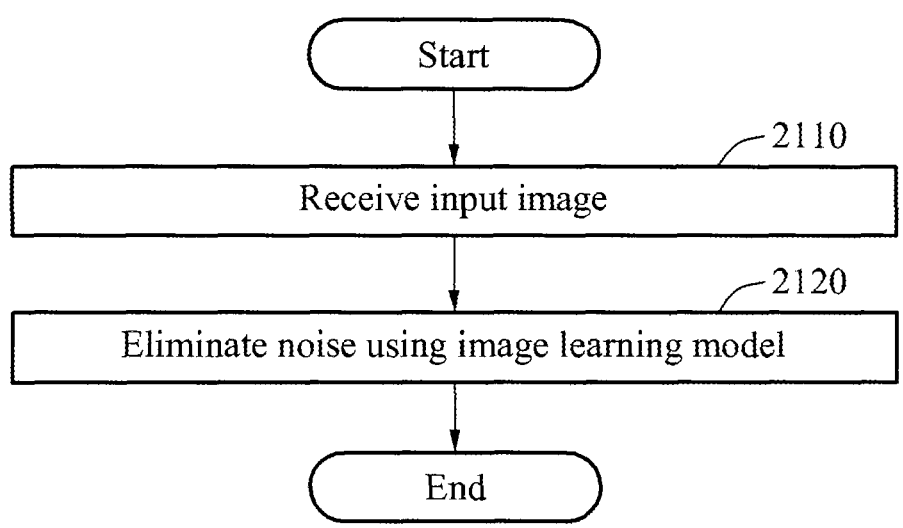
FIG. 21 is a flowchart illustrating an example of a method of eliminating noise from an image according to at least one example embodiment.

FIG. 21 is a flowchart illustrating a method of eliminating noise from an image according to at least one example embodiments.

Referring to FIG. 21, in operation 2110, an input receiver receives an input image. The input image may include noise. For example, the input image may be the synthetic image and the output image generated through the operations described with reference to FIGS. 19 and 20.

In operation 2120, a noise eliminating device eliminates the noise using an image learning model. For example, the noise eliminating device may generate an output image from which the noise in the input image is eliminated using at least one learning model trained in elimination of image noise from a patch of at least one predetermined size.

The image learning model may include a plurality of learning models, for example, connection weights of a neural network, corresponding to patches of predetermined sizes. For example, in operation 2120, the noise eliminating device may eliminate noise at each level based on a patch size.

For a detailed description of operations 2110 and 2120, reference may be made to the description provided with reference to FIGS. 13 through 18.

The methods described with reference to FIGS. 19 through 21 may be autonomously performed, or at least two methods may be combined to be performed. Alternatively, an order of the methods may be changed as necessary.

The units, devices, models, learners, extractors, generators, receivers, eliminators and/or modules described herein may be implemented using hardware components and hardware components executing software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a synthetic image, the method comprising:
   receiving input images;
   extracting feature values corresponding to the input images using a first image learning model, the first image learning model permitting an input and an output to be identical; and
   generating a synthetic image based on the feature values corresponding to the input images using the first image learning model, the generating the synthetic image includes,
       combining the feature values, wherein each of the feature values are extracted from a different corresponding input image among the input images, and
       generating the synthetic image from the combined feature values using the first image learning model.

2. The method of claim 1, wherein the first image learning model comprises a neural network, the neural network including at least one layer connected to another layer through a connection line, the connection line having a connection weight.

3. The method of claim 1, wherein the combining the feature values comprises:
   combining the feature values based on a set ratio.

4. The method of claim 2, wherein the feature values correspond to an uppermost layer of the neural network from each input image.

5. The method of claim 2, wherein the connection weight reduces an error between a reference input image and an output image corresponding to the reference input image.

6. The method of claim 1, wherein the input images comprise face images of different individuals.

7. The method of claim 1, further comprising:
   receiving the synthetic image and angle information, the synthetic image including an object; and
   generating an output image based on the synthetic image and the angle information using a second image learning model, the second image learning model being trained in pairs of references images corresponding to different angles, the output image including the object.

8. The method of claim 7, wherein the generating the output image comprises:
   generating the output image by converting the synthetic image to correspond to the angle information using the second image learning model.

9. The method of claim 7, wherein
   the pairs of reference images comprise a first reference angle image corresponding to a first angle and a second reference angle image corresponding to a second angle, and
   wherein the first reference angle image and the second reference angle image include an identical reference object.

10. The method of claim 9, wherein the second image learning model comprises a neural network, the neural network including at least one layer connected to another layer through a connection line, the connection line having a connection weight.

11. The method of claim 10, wherein the connection weight of the neural network allows the second reference angle image to be output based on the second angle and the first reference angle image.

12. The method of claim 7, wherein the angle information comprises information associated with an angle for the object.

13. The method of claim 7, wherein the object comprises a human face.

14. The method of claim 7, further comprising:
removing noise from at least one patch in the output image using at least one third image learning model.

15. The method of claim 14, wherein the third image learning model comprises a neural network, the neural network including at least one layer connected to another layer through a connection line, the connection line having a connection weight.

16. The method of claim 15, wherein the connection weight is learned to allow a reference output image to be generated from a patch of a reference input image.

17. The method of claim 14, wherein
the third image learning model permits a reference output image from which noise is eliminated to be generated from a reference input image including noise, and
the removing the noise includes,
eliminating the noise from the output image using the third image learning model.

18. The method of claim 14, wherein the third image learning model comprises:
a fourth learning model to allow a first size patch of a reference output image from which noise is eliminated to be generated from the first sized patch of a reference input image; and
a fifth learning model to allow a second size patch of the reference output image from which noise is eliminated to be generated from the second size patch of the reference input image.

19. The method of claim 18, wherein the removing the noise comprises:
eliminating noise from the output image in a unit of the first size patch using the fourth learning model; and
eliminating noise in a unit of the second size patch, using the fifth learning model, from the output image from which the noise is eliminated in the unit of the first size patch.

* * * * *